(No Model.)
T. A. CROSS.
SPRING MOTOR.
No. 544,350.
2 Sheets—Sheet 1.
Patented Aug. 13, 1895.
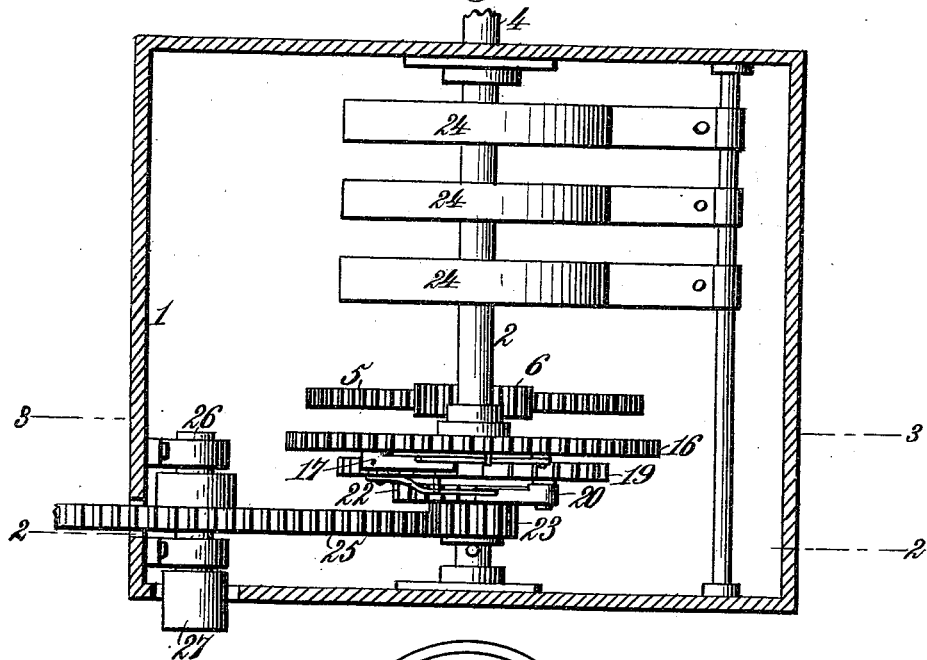
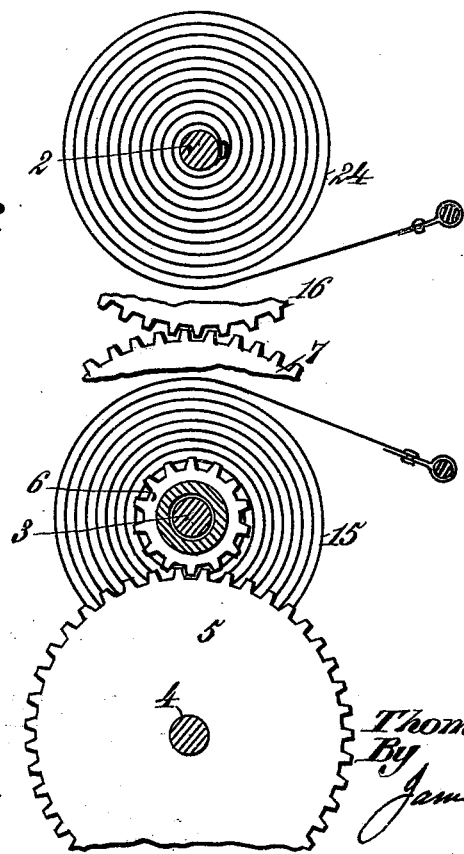
Witnesses.
Robert Errett,
Dennis Sumby.
Inventor:
Thomas A. Cross.
By James L. Norris.
Atty.

(No Model.) 2 Sheets—Sheet 2.
T. A. CROSS.
SPRING MOTOR.
No. 544,350. Patented Aug. 13, 1895.
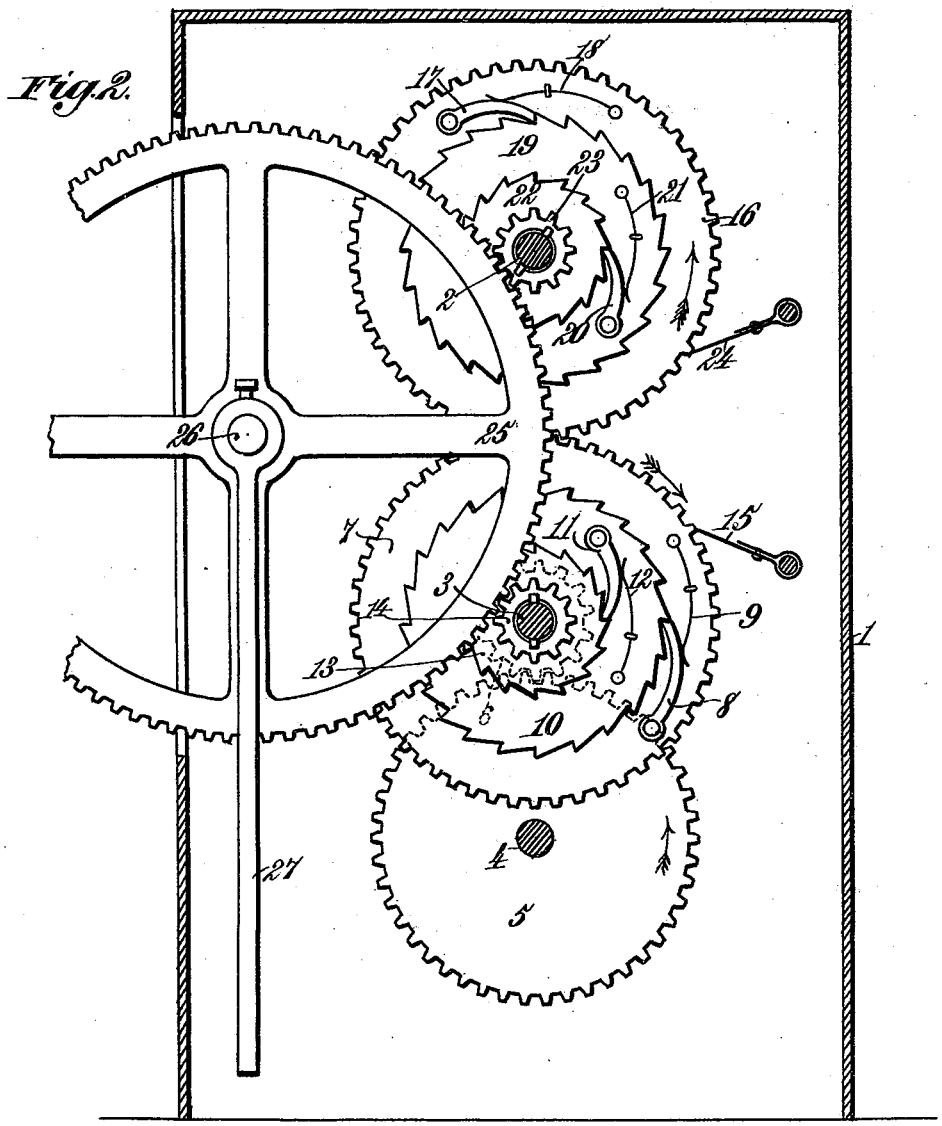
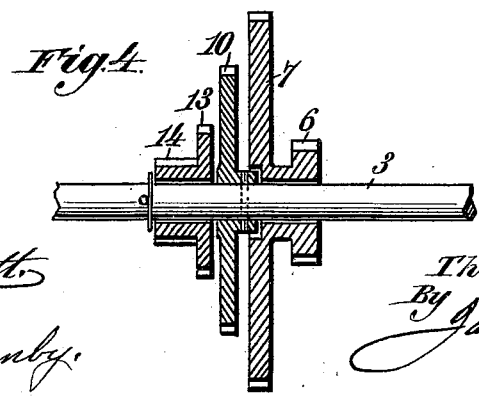
Witnesses.
Inventor:
Thomas A. Cross.
By James L. Norris
Atty.

UNITED STATES PATENT OFFICE.

THOMAS A. CROSS, OF BARDWELL, KENTUCKY.

SPRING-MOTOR.

SPECIFICATION forming part of Letters Patent No. 544,350, dated August 13, 1895.

Application filed December 14, 1894. Serial No. 531,755. (No model.)

*To all whom it may concern:*

Be it known that I, THOMAS A. CROSS, a citizen of the United States, residing at Bardwell, in the county of Carlisle and State of Kentucky, have invented new and useful Improvements in Spring-Motors, of which the following is a specification.

This invention relates to spring-motors, and has for its object to provide a simple and thoroughly-effective automatic power-machine adapted to a great variety of purposes and in which a smooth-running and continuously-regular power will be developed by the alternate winding of two or more sets of oppositely-pulling springs connected to shafts or spindles that are provided, respectively, with right and left running ratchet-wheels mounted on said shafts to connect on the one hand with a winding mechanism and on the other hand with loosely-mounted gears through which the power stored by the spring or springs on one shaft or spindle may be communicated to another shaft or spindle, and thence to a driving-shaft or power-wheel.

One of the principal purposes of my invention is to so connect and actuate the winding-pinions and connected ratchet mechanisms of several spring-carrying shafts or spindles that one spring or set of springs will be in process of winding while another spring or set of springs is operating to drive the machine, thus maintaining a regular and steady application of power first from one set of springs or several sets of springs acting together and then from another set or other sets of springs, the gearing of the spring-carrying shafts or spindles being such as to permit the revolution of any shaft in one direction without affecting the proper movement of the train of driving-gears.

My invention has for its further object to improve and simplify the construction and relative arrangement of the parts of a spring-motor in such manner as to greatly reduce the friction and provide a cheap and effective light-running motor adapted to the driving of all kinds of machinery and the propulsion of cars and various vehicles, water craft, &c.

The invention consists in the features of construction and novel combination of devices in a spring-motor, as hereinafter more particularly described and claimed.

In the annexed drawings, illustrating the invention, Figure 1 may represent either a plan or an elevation of a simple form of my improved spring-motor. Fig. 2 is a transverse section of the motor on the line 2 2 of Fig. 1. Fig. 3 is a similar section on the line 3 3 of Fig. 1. Fig. 4 is a section through one set of the ratchet-gears.

Referring to the drawings, the numeral 1 designates a casing of any suitable construction and in which the spring-carrying shafts or spindles 2 and 3 are mounted in conveniently-arranged bearings. In the drawings I have shown only two of these spindles or one set; but, as will hereinafter appear, there may be provided any required number of such spring-bearing shafts or spindles, according to the power that it may be desired to develop. The casing 1 may be also provided with bearings for a shaft 4, through which the power developed by the motor is to be applied or utilized in the driving of machinery or the propulsion of vehicles on land or water.

The shaft 4 has rigidly mounted thereon a spur-gear 5, meshing with a pinion 6, that is loose on the adjacent spring-carrying shaft or spindle 3, but rigid with a spur-gear 7, that is also loosely mounted on said spindle. This spur-gear 7 has attached to one side a pawl 8, that is held by a spring 9 into engagement with a ratchet-wheel 10, with which the spring-carrying shaft or spindle 3 is rigid. To the rigidly-mounted ratchet-wheel 10 is attached a pawl 11, that is pressed by a spring 12 into engagement with a smaller ratchet-wheel 13, which is loose on the spindle 3 and has its teeth projecting or inclined in a direction that is opposite to the inclination of the teeth on the larger and rigidly-mounted ratchet-wheel. The smaller and loose ratchet-wheel 13 is rigid with a pinion 14, likewise loose on the spindle 3 and through which is applied the power for winding the coiled springs 15, that are connected to said spindle.

On the other spring-carrying shaft or spindle 2 is a loosely-mounted spur-gear 16, meshing with the loose spur-gear 7 on the spindle 3, and having a pawl 17 pressed by a spring 18 into engagement with a large ratchet-wheel 19, with which the spindle 2 is rigidly connected, and this ratchet-wheel 19 carries a pawl 20, pressed by a spring 21 into engagement with a smaller ratchet-wheel 22, secured to a pinion 23 and loose therewith on the shaft or spindle 2, with which a series of coiled springs 24 is connected. It will be understood that the meshing spur-gears 7 and 16 are loose on their respective shafts, on which the large ratchet-wheels 10 and 19 are rigidly secured, and thus each spring-carrying shaft or spindle 2 or 3 is free to revolve in one direction, as in winding the springs 15 or 24, without affecting or obstructing the proper movement of the train of spur-gears and pinion through which the working power of the motor is transmitted. The ratchet mechanisms on the spring-carrying shafts or spindles 2 and 3 are constructed and mounted in the same manner except that they are respectively right or left running or arranged to operate in opposite directions.

To each shaft 2 and 3 may be attached a series of coiled springs 15 or 24, of any required strength and in any desired number, according to the work to be done. On each shaft the springs are coiled in a direction opposite to the coiling of the springs on the other shaft. Thus while one set of springs is engaged in operating the motor the other set may be in process of winding to store the power required for continuing the driving of machinery or the propulsion of a vehicle. It will be obvious that in a light motor there may be only one spring connected to each shaft 2 and 3, or I may attach any desired number of springs to each shaft, so as to largely increase the power and adapt the motor to the work required. The two sets of springs are to be alternately wound, so that they will exert their power successively and effect a uniformly smooth, regular, and steady running of the motor.

While the alternate winding of the two springs or sets of springs may be accomplished by any suitable or convenient means, it is preferable to mount a winding-gear 25 in such position as to mesh at once with the pinions 14 and 23 on the two spring-carrying shafts or spindles. As this winding-gear 25 is to have only an oscillatory movement, it may be given the form of a segment, having its fulcrum or journal 26 located at a suitable point in the casing of the motor. In order to actuate this winding-gear 25 by hand or otherwise it may be provided with a lever 27 of any suitable form.

By oscillating the winding-gear 25 in the proper direction it will be caused to rotate the loose pinion 23 and attached ratchet-wheel 22 against the pawl 20 of the fast ratchet-wheel 19 in such manner as to rotate the shaft or spindle 2 in the required direction for winding up the springs 24 on said shaft. The power thus stored in these springs 24 is exerted in rotating the shaft or spindle 2 in a contrary direction, and the fast ratchet-wheel 19 will now be caused to push against the pawl 17 on the loose spur-gear 16, which is thus rotated on the shaft or spindle 2 in the direction indicated by the arrow in Fig. 2. This movement of the spur-gear 16 is transmitted (see arrows, Fig. 2) through the loose spur-gear 7 and its pinion 6 to the spur-gear 5 on the shaft 4, from which the power thus developed by the motor may be taken and applied in any required or suitable manner and for any desired purpose, whether to drive machinery or for the propulsion of boats or other vessels, or to propel cars and other vehicles. While the fast ratchet-wheel 19 on the shaft 2 is engaged in pushing onto the pawl 17 of the spur-gear 16, thereby rotating said spur-gear, it is also carrying its own pawl 20 in such direction as to push against and rotate the loose ratchet-wheel 22 and attached pinion 23, which is in mesh with the winding-gear 25, and thus this winding-gear is oscillated backward. Therefore, while the motor is being driven through power derived from the coiled springs 24 on the shaft or spindle 2, the winding-gear 25 in mesh with the pinion 14 will actuate the winding mechanism of the shaft or spindle 3 in such direction as to effect a proper winding of the springs 15 attached to said latter shaft or spindle. In like manner while the coiled springs 15 are in turn engaged in driving the motor the springs 24 will be in process of winding. A steady and continuously-regular operation of the spring-motor is thus secured, and by reason of the loose mounting of the intermeshing gears 7 and 16 on their respective shafts the alternately-acting spring-power mechanisms of the two shafts or spindles 2 and 3 cannot in any way obstruct each other.

The arrangement of the segmental winding-gear 25 to mesh at once with the loose pinions 14 and 23 on the two spring-carrying shafts, and the manner of arranging the ratchet connections for these pinions and their shafts, will be found to furnish an exceedingly simple and effective means for accomplishing the alternate winding of the two sets of power-springs, so that each will be ready for operation in its turn.

This spring-motor can be applied with great advantage to a large variety of mechanical uses, and may be easily kept in repair at slight expense.

It will be obvious that there may be several sets of spring-bearing shafts—such as 2 and 3—geared so as to mesh with the oscillatory winding-wheel 25, which, in such case, will be a full-cogged gear. There may, for instance, be four sets of spring-bearing shafts or spindles, two in each set, and thus permit utilizing the power of, say, eight spring bearing-shafts, all of which will be geared and operated in the same manner as the shafts or spindles 2 and 3 already described, so that the power developed by the winding of all the springs may be thrown onto the gear 5 of the shaft 4, and be thus transmitted to any desired point.

What I claim as my invention is—

1. In a spring-motor, the combination of the spring-carrying shafts, the loose spur gears mounted on said shafts in mesh with each other and each provided with a pawl, ratchet wheels fast on said shafts and having their teeth engaged with the pawls on said spur gears, each of said fast ratchet wheels being provided with a pawl, pinions loose on said shafts and having ratchet wheels that are engaged with the pawls of the fast ratchet wheels and an oscillatory winding gear that is in mesh with the said pinions of all the spring carrying shafts, whereby the spring or springs on one shaft will be wound while the motor is operated from another spring carrying shaft, substantially as described.

2. In a spring-motor, the combination of shafts that are each provided with a series of coiled springs, the springs on the respective shafts being coiled in opposite directions, spur gears loosely mounted on said shafts in mesh with each other and each provided with a pawl, ratchet wheels fast on said shafts and having their teeth engaged with the pawls on said spur gears, each of said fast ratchet wheels being provided with a pawl, pinions loose on said shafts and having ratchet wheels that are engaged with the pawls of the fast ratchet wheels, the ratchet wheels of alternate shafts being right and left running, respectively, and arranged in opposite directions, an oscillatory winding gear in mesh with the loose pinions of the spring carrying shafts, whereby the springs on one or more shafts will be wound while the springs on another shaft are engaged in operating the motor, a pinion secured to the spur gear of one of the spring carrying shafts, and a power transmitting shaft having a spur gear in mesh with said pinion substantially as described.

3. In a spring-motor, the combination of shafts having springs attached thereto and coiled in opposite directions on alternate shafts, intermeshing spur gears loosely mounted on said shafts and one of said spur gears having a pinion secured thereto for gearing with a power transmitting shaft, oppositely operating ratchet mechanisms mounted on the respective spring carrying shafts and adapted to connect in one direction with the loose spur gears on said shafts, and a winding gearing connecting the spring-carrying shafts and adapted to operate for winding one set of springs while another set is engaged in operating the motor, substantially as described.

In testimony whereof I have hereunto set my hand and affixed my seal in presence of two subscribing witnesses.

THOMAS A. CROSS. [L. S.]

Witnesses:
 ISAAC E. PRICE,
 XANNAN A. CROSS.